(12) United States Patent
Murphey et al.

(10) Patent No.: US 9,773,017 B2
(45) Date of Patent: *Sep. 26, 2017

(54) METHOD OF CONFIGURING A VIRTUAL APPLICATION

(71) Applicant: Code Systems Corporation, Seattle, WA (US)

(72) Inventors: C. Michael Murphey, Seattle, WA (US); Kenji C. Obata, Seattle, WA (US)

(73) Assignee: CODE SYSTEMS CORPORATION, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,033

(22) Filed: Jan. 28, 2015

(65) Prior Publication Data

US 2015/0150005 A1    May 28, 2015

(51) Int. Cl.
*G06F 9/455* (2006.01)
*G06F 17/30* (2006.01)
*G06F 9/44* (2006.01)
*G06F 21/53* (2013.01)

(52) U.S. Cl.
CPC .......... *G06F 17/30233* (2013.01); *G06F 8/71* (2013.01); *G06F 9/45533* (2013.01); *G06F 9/45558* (2013.01); *G06F 21/53* (2013.01); *G06F 2009/45587* (2013.01)

(58) Field of Classification Search
CPC ............................. G06F 17/30233; G06F 8/71
See application file for complete search history.

(56) References Cited

U.S. PATENT DOCUMENTS

| | | |
|---|---|---|
| 4,468,732 A | 8/1984 | Raver |
| 5,437,031 A | 7/1995 | Kitami |
| 5,495,610 A | 2/1996 | Shing et al. |
| 5,774,713 A | 6/1998 | Yokota |
| 5,860,068 A | 1/1999 | Cook |
| 5,987,590 A | 11/1999 | Wing So |
| 6,023,712 A | 2/2000 | Spear et al. |
| 6,192,375 B1 | 2/2001 | Gross |

(Continued)

OTHER PUBLICATIONS

Notice of Allowance, 17 pages, received in U.S. Appl. No. 12/879,956, dated Feb. 21, 2013.

(Continued)

*Primary Examiner* — Xuxing Chen
(74) *Attorney, Agent, or Firm* — Davis Wright Tremaine LLP; Heather M. Colburn (57) ABSTRACT

A method of modifying a virtual application configuration to include modifications made at runtime by a virtual application that is implemented by a first virtualized application file that was created previously using the virtual application configuration. At runtime, the virtual application implemented by the first virtualized application file stores modifications to its configuration in a sandbox memory location. The method includes reading the modifications from the sandbox memory location. Then, the modifications are written to the virtual application configuration. The modified virtual application configuration is then used to create a second virtualized application file that includes the modifications stored in the sandbox memory location.

21 Claims, 5 Drawing Sheets

(56) References Cited

U.S. PATENT DOCUMENTS

| | | |
|---|---|---|
| 6,263,363 B1 | 7/2001 | Rosenblatt et al. |
| 6,345,212 B1 | 2/2002 | Nourse |
| 6,366,947 B1 | 4/2002 | Kavner |
| 6,453,334 B1 | 9/2002 | Vinson et al. |
| 6,493,733 B1 | 12/2002 | Pollack et al. |
| 6,564,229 B1 | 5/2003 | Baweja et al. |
| 6,675,216 B1 | 1/2004 | Quatrano et al. |
| 6,704,808 B2 | 3/2004 | Kasamatsu et al. |
| 6,757,893 B1 | 6/2004 | Haikin |
| 7,028,295 B2 | 4/2006 | Li et al. |
| 7,064,760 B2 | 6/2006 | Capin et al. |
| 7,065,504 B2 | 6/2006 | Sakuma et al. |
| 7,076,768 B2 | 7/2006 | Li et al. |
| 7,089,259 B1 | 8/2006 | Kouznetsov et al. |
| 7,096,253 B2 | 8/2006 | Vinson et al. |
| 7,096,416 B1 | 8/2006 | Smith et al. |
| 7,117,495 B2 | 10/2006 | Blaser et al. |
| 7,130,073 B2 | 10/2006 | Kumar et al. |
| 7,162,036 B2 | 1/2007 | Rowe |
| 7,240,162 B2 | 7/2007 | De Vries |
| 7,246,351 B2 | 7/2007 | Bloch et al. |
| 7,272,613 B2 | 9/2007 | Sim et al. |
| 7,337,298 B2 | 2/2008 | Kawachiya et al. |
| 7,356,679 B1 | 4/2008 | Le et al. |
| 7,360,097 B2 | 4/2008 | Rothstein |
| 7,386,542 B2 | 6/2008 | Maybury et al. |
| 7,386,546 B1 | 6/2008 | Santry et al. |
| 7,437,371 B2 | 10/2008 | Rathakrishnan et al. |
| 7,451,176 B2 | 11/2008 | Anders et al. |
| 7,451,196 B1 | 11/2008 | de Vries et al. |
| 7,499,991 B2 | 3/2009 | Johnson |
| 7,519,959 B1 | 4/2009 | Dmitriev |
| 7,523,116 B2 | 4/2009 | Yan |
| 7,529,784 B2 | 5/2009 | Kavuri et al. |
| 7,536,541 B2 | 5/2009 | Isaacson |
| 7,577,751 B2 | 8/2009 | Vinson et al. |
| 7,584,342 B1 | 9/2009 | Nordquist et al. |
| 7,590,644 B2 | 9/2009 | Matsakis et al. |
| 7,600,097 B1 | 10/2009 | Wright |
| 7,607,127 B2 | 10/2009 | Romm et al. |
| 7,623,673 B1 | 11/2009 | Mercier |
| 7,634,477 B2 | 12/2009 | Hinshaw |
| 7,634,772 B2 | 12/2009 | Parthasarathy et al. |
| 7,664,367 B2 | 2/2010 | Suzuki |
| 7,669,189 B1 | 2/2010 | Umamageswaran |
| 7,689,825 B2 | 3/2010 | Iwamura |
| 7,707,564 B2 | 4/2010 | Marvin et al. |
| 7,743,407 B2 | 6/2010 | Sprigg et al. |
| 7,752,442 B2 | 7/2010 | Della-Libera et al. |
| 7,752,511 B2 | 7/2010 | Fulton et al. |
| 7,761,503 B2 | 7/2010 | Dhawan et al. |
| 7,797,748 B2 | 9/2010 | Zheng et al. |
| 7,801,827 B2 | 9/2010 | Bishop et al. |
| 7,831,047 B2 | 11/2010 | Rowe |
| 7,836,299 B2 | 11/2010 | England et al. |
| 7,840,961 B1 | 11/2010 | Weathersby |
| 7,950,026 B1 | 5/2011 | Urbach |
| 7,958,497 B1 | 6/2011 | Lindo et al. |
| 7,970,789 B1 * | 6/2011 | Blaser et al. ............... 707/783 |
| 7,971,032 B2 | 6/2011 | Shattuck |
| 8,010,667 B2 | 8/2011 | Zhang et al. |
| 8,065,675 B2 | 11/2011 | Strauss et al. |
| 8,069,443 B2 | 11/2011 | Ackerman et al. |
| 8,073,926 B2 | 12/2011 | Traut et al. |
| 8,180,884 B1 | 5/2012 | Hall |
| 8,219,805 B1 | 7/2012 | Ie et al. |
| 8,230,414 B1 | 7/2012 | Hand et al. |
| 8,230,442 B2 | 7/2012 | Aho et al. |
| 8,271,944 B2 | 9/2012 | Austin et al. |
| 8,347,208 B2 | 1/2013 | Howell |
| 8,356,266 B1 | 1/2013 | Ou et al. |
| 8,375,140 B2 | 2/2013 | Tippin et al. |
| 8,387,006 B1 | 2/2013 | Taylor |
| 8,429,248 B1 | 4/2013 | Ketrenos et al. |
| 8,434,093 B2 | 4/2013 | Larimore et al. |
| 8,453,049 B1 | 5/2013 | Grieve |
| 8,468,175 B2 | 6/2013 | Obata |
| 8,489,513 B2 | 7/2013 | Bishop et al. |
| 8,510,734 B2 | 8/2013 | Criddle et al. |
| 8,626,806 B2 | 1/2014 | Larimore et al. |
| 8,645,488 B2 | 2/2014 | Ivory et al. |
| 8,677,345 B2 | 3/2014 | Choi et al. |
| 8,719,898 B1 | 5/2014 | Barton et al. |
| 8,745,601 B1 | 6/2014 | Carlson et al. |
| 8,762,951 B1 | 6/2014 | Kosche et al. |
| 8,763,009 B2 | 6/2014 | Degirmenci et al. |
| 8,806,325 B2 | 8/2014 | Decker |
| 8,978,012 B1 | 3/2015 | Poole |
| 8,990,289 B2 | 3/2015 | Mott |
| 9,003,541 B1 | 4/2015 | Patidar |
| 9,098,706 B1 | 8/2015 | Kennedy |
| 9,158,845 B1 | 10/2015 | Reddy |
| 9,208,169 B2 | 12/2015 | Obata |
| 9,229,748 B2 | 1/2016 | Larimore et al. |
| 9,268,542 B1 | 2/2016 | Mars et al. |
| 9,569,286 B2 | 2/2017 | Larimore et al. |
| 2001/0016905 A1 | 8/2001 | Kasamatsu et al. |
| 2002/0029283 A1 | 3/2002 | Beckett et al. |
| 2002/0032754 A1 | 3/2002 | Logston et al. |
| 2002/0066085 A1 | 5/2002 | Nowlin, Jr. et al. |
| 2002/0099951 A1 | 7/2002 | O'Connor |
| 2002/0112078 A1 | 8/2002 | Yach |
| 2002/0129129 A1 | 9/2002 | Bloch et al. |
| 2002/0133491 A1 | 9/2002 | Sim et al. |
| 2002/0138441 A1 | 9/2002 | Lopatic |
| 2002/0161578 A1 | 10/2002 | Saindon et al. |
| 2002/0162015 A1 | 10/2002 | Tang |
| 2002/0174193 A1 | 11/2002 | Mikhalchuk |
| 2003/0005118 A1 | 1/2003 | Williams |
| 2003/0031176 A1 | 2/2003 | Sim et al. |
| 2003/0051169 A1 | 3/2003 | Sprigg et al. |
| 2004/0003390 A1 | 1/2004 | Canter |
| 2004/0044645 A1 | 3/2004 | Palumbo |
| 2004/0083474 A1 | 4/2004 | McKinlay et al. |
| 2004/0111671 A1 | 6/2004 | Lu |
| 2004/0128342 A1 | 7/2004 | Maes et al. |
| 2004/0133444 A1 | 7/2004 | Defaix et al. |
| 2004/0139315 A1 | 7/2004 | Tokutani et al. |
| 2004/0237082 A1 | 11/2004 | Alcazar |
| 2004/0255293 A1 | 12/2004 | Spotswood |
| 2005/0010932 A1 | 1/2005 | Kohno et al. |
| 2005/0132359 A1 | 6/2005 | McGuire et al. |
| 2005/0198628 A1 | 9/2005 | Graham et al. |
| 2005/0198647 A1 | 9/2005 | Hipp et al. |
| 2005/0235282 A1 | 10/2005 | Anderson |
| 2005/0262553 A1 | 11/2005 | Bialick et al. |
| 2005/0273772 A1 | 12/2005 | Matsakis et al. |
| 2005/0283673 A1 | 12/2005 | Ode |
| 2005/0289546 A1 | 12/2005 | Shpeisman et al. |
| 2006/0048136 A1 | 3/2006 | Vries et al. |
| 2006/0053380 A1 | 3/2006 | Spataro et al. |
| 2006/0074733 A1 | 4/2006 | Shukla et al. |
| 2006/0075064 A1 | 4/2006 | Keohane et al. |
| 2006/0085359 A1 | 4/2006 | Kim |
| 2006/0117325 A1 | 6/2006 | Wieland et al. |
| 2006/0123185 A1 | 6/2006 | de Vries et al. |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1 | 10/2006 | de Vries et al. |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2006/0259585 A1 | 11/2006 | Keohane et al. |
| 2007/0011672 A1 | 1/2007 | Bhide et al. |
| 2007/0016721 A1 | 1/2007 | Gay |
| 2007/0043943 A1 | 2/2007 | Peretti |
| 2007/0074191 A1 | 3/2007 | Geisinger |
| 2007/0078988 A1 | 4/2007 | Miloushev et al. |
| 2007/0083482 A1 | 4/2007 | Rathi et al. |
| 2007/0143672 A1 | 6/2007 | Lipton |
| 2007/0143704 A1 | 6/2007 | Laird-McConnell |
| 2007/0168953 A1 | 7/2007 | Diez et al. |

(56) References Cited

U.S. PATENT DOCUMENTS

| | | |
|---|---|---|
| 2007/0168965 A1 | 7/2007 | Zenz et al. |
| 2007/0174824 A1 | 7/2007 | Relyea et al. |
| 2007/0192329 A1 | 8/2007 | Croft et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0277102 A1 | 11/2007 | Kanzaki |
| 2007/0283324 A1 | 12/2007 | Geisinger |
| 2007/0294373 A1 | 12/2007 | Harrison |
| 2007/0294674 A1 | 12/2007 | Marilly et al. |
| 2008/0010389 A1 | 1/2008 | Iwata |
| 2008/0016397 A1 | 1/2008 | Pagan |
| 2008/0034268 A1 | 2/2008 | Dodd et al. |
| 2008/0034364 A1 | 2/2008 | Lam et al. |
| 2008/0092057 A1 | 4/2008 | Monson et al. |
| 2008/0126785 A1 | 5/2008 | Chong et al. |
| 2008/0154985 A1 | 6/2008 | Childs et al. |
| 2008/0155171 A1 | 6/2008 | Jeong |
| 2008/0163194 A1 | 7/2008 | Dias et al. |
| 2008/0181230 A1 | 7/2008 | Hitt et al. |
| 2008/0184135 A1 | 7/2008 | Washburn et al. |
| 2008/0184211 A1 | 7/2008 | Nickolls et al. |
| 2008/0201705 A1 | 8/2008 | Wookey |
| 2008/0215722 A1 | 9/2008 | Hogaboom et al. |
| 2008/0235680 A1 | 9/2008 | Strauss |
| 2008/0275938 A1 | 11/2008 | Yach |
| 2008/0281882 A1 | 11/2008 | Hachio et al. |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0037287 A1 | 2/2009 | Baitalmal et al. |
| 2009/0055542 A1 | 2/2009 | Zhao et al. |
| 2009/0064086 A1 | 3/2009 | Faus et al. |
| 2009/0076898 A1 | 3/2009 | Wang et al. |
| 2009/0076966 A1 | 3/2009 | Bishop et al. |
| 2009/0077551 A1 | 3/2009 | Whiteley |
| 2009/0077645 A1 | 3/2009 | Kottahachchi |
| 2009/0110307 A1 | 4/2009 | Markowitz |
| 2009/0125907 A1 | 5/2009 | Wen et al. |
| 2009/0132811 A1 | 5/2009 | Koster et al. |
| 2009/0133013 A1 | 5/2009 | Criddle et al. |
| 2009/0158432 A1 | 6/2009 | Zheng et al. |
| 2009/0164570 A1 | 6/2009 | Paila |
| 2009/0172664 A1 | 7/2009 | Mostafa |
| 2009/0193057 A1 | 7/2009 | Maes |
| 2009/0198358 A1 | 8/2009 | Logan et al. |
| 2009/0199175 A1* | 8/2009 | Keller et al. ............. 717/178 |
| 2009/0216811 A1* | 8/2009 | Manczak et al. ......... 707/201 |
| 2009/0235158 A1 | 9/2009 | Rosenstein et al. |
| 2009/0240663 A1 | 9/2009 | Plattner et al. |
| 2009/0248695 A1 | 10/2009 | Ozzie |
| 2009/0249071 A1 | 10/2009 | De Atley et al. |
| 2009/0249324 A1* | 10/2009 | Brar et al. ................ 717/173 |
| 2009/0300076 A1 | 12/2009 | Friedman et al. |
| 2009/0300151 A1 | 12/2009 | Friedman et al. |
| 2009/0307351 A1 | 12/2009 | Raja et al. |
| 2009/0307763 A1 | 12/2009 | Rawlins et al. |
| 2009/0313322 A1 | 12/2009 | Sheehan et al. |
| 2009/0328030 A1 | 12/2009 | Fries |
| 2010/0005291 A1 | 1/2010 | Hulten et al. |
| 2010/0023640 A1 | 1/2010 | Vinson et al. |
| 2010/0023726 A1 | 1/2010 | Aviles |
| 2010/0023934 A1 | 1/2010 | Sheehan et al. |
| 2010/0023974 A1 | 1/2010 | Shiragaki et al. |
| 2010/0037206 A1 | 2/2010 | Larimore et al. |
| 2010/0037216 A1 | 2/2010 | Carcerano et al. |
| 2010/0037235 A1 | 2/2010 | Larimore et al. |
| 2010/0064295 A1 | 3/2010 | Aho et al. |
| 2010/0077096 A1 | 3/2010 | Philip et al. |
| 2010/0082926 A1 | 4/2010 | Sahita et al. |
| 2010/0088448 A1 | 4/2010 | Min et al. |
| 2010/0106804 A1 | 4/2010 | He et al. |
| 2010/0107163 A1 | 4/2010 | Lee |
| 2010/0121973 A1 | 5/2010 | Lobacheva et al. |
| 2010/0131084 A1 | 5/2010 | Van Camp |
| 2010/0132009 A1 | 5/2010 | Khemani et al. |
| 2010/0138479 A1 | 6/2010 | Zhu |
| 2010/0146590 A1 | 6/2010 | Jung |
| 2010/0169790 A1 | 7/2010 | Vaughan et al. |
| 2010/0205604 A1 | 8/2010 | Brower et al. |
| 2010/0223598 A1 | 9/2010 | Levine |
| 2010/0235831 A1 | 9/2010 | Dittmer |
| 2010/0241718 A1 | 9/2010 | Rasmussen et al. |
| 2010/0250782 A1 | 9/2010 | Pratt et al. |
| 2010/0281458 A1 | 11/2010 | Paladino et al. |
| 2010/0306849 A1 | 12/2010 | Zheng et al. |
| 2010/0318997 A1 | 12/2010 | Li et al. |
| 2010/0322523 A1 | 12/2010 | Mitsuhashi et al. |
| 2010/0333085 A1 | 12/2010 | Criddle et al. |
| 2011/0004840 A1 | 1/2011 | Feinberg et al. |
| 2011/0022947 A1 | 1/2011 | Rajkumar |
| 2011/0029641 A1 | 2/2011 | Fainberg |
| 2011/0078625 A1 | 3/2011 | Mumford et al. |
| 2011/0106908 A1 | 5/2011 | Risku et al. |
| 2011/0145428 A1 | 6/2011 | Wei et al. |
| 2011/0145592 A1 | 6/2011 | Greiner |
| 2011/0145726 A1 | 6/2011 | Wei et al. |
| 2011/0153437 A1 | 6/2011 | Archer et al. |
| 2011/0153975 A1 | 6/2011 | Accapadi et al. |
| 2011/0154213 A1 | 6/2011 | Wheatley |
| 2011/0173251 A1 | 7/2011 | Sandhu et al. |
| 2011/0179411 A1 | 7/2011 | Lederer |
| 2011/0185013 A1 | 7/2011 | Obata et al. |
| 2011/0185043 A1 | 7/2011 | Zeller et al. |
| 2011/0191772 A1 | 8/2011 | Larimore et al. |
| 2011/0225584 A1 | 9/2011 | Andrade et al. |
| 2011/0225592 A1 | 9/2011 | Goldin |
| 2011/0246659 A1 | 10/2011 | Bouazizi |
| 2011/0265078 A1 | 10/2011 | Beatty et al. |
| 2011/0289513 A1 | 11/2011 | Degirmenci et al. |
| 2011/0302274 A1 | 12/2011 | Lee et al. |
| 2012/0005237 A1 | 1/2012 | Obata |
| 2012/0005244 A1 | 1/2012 | Obata et al. |
| 2012/0005246 A1 | 1/2012 | Obata |
| 2012/0005309 A1 | 1/2012 | Obata et al. |
| 2012/0005310 A1 | 1/2012 | Obata |
| 2012/0005334 A1 | 1/2012 | Raja et al. |
| 2012/0005674 A1 | 1/2012 | Larimore et al. |
| 2012/0054744 A1 | 3/2012 | Singh et al. |
| 2012/0090021 A1 | 4/2012 | Luh et al. |
| 2012/0096071 A1 | 4/2012 | Murphey et al. |
| 2012/0110337 A1 | 5/2012 | Murphey et al. |
| 2012/0125993 A1 | 5/2012 | Thiele et al. |
| 2012/0150986 A1 | 6/2012 | Piccinini et al. |
| 2012/0155358 A1 | 6/2012 | Hao et al. |
| 2012/0203807 A1 | 8/2012 | Larimore et al. |
| 2012/0203808 A1 | 8/2012 | Larimore et al. |
| 2013/0086386 A1 | 4/2013 | Murphey et al. |
| 2013/0104208 A1 | 4/2013 | Kumar et al. |
| 2013/0104219 A1 | 4/2013 | Kumar et al. |
| 2013/0117567 A1 | 5/2013 | Chang et al. |
| 2013/0132525 A1 | 5/2013 | Tippin |
| 2013/0139250 A1 | 5/2013 | Lo et al. |
| 2013/0191882 A1 | 7/2013 | Jolfaei |
| 2013/0247070 A1 | 9/2013 | Larimore et al. |
| 2013/0254848 A1 | 9/2013 | Ge |
| 2013/0271456 A1 | 10/2013 | Haswell et al. |
| 2013/0275886 A1 | 10/2013 | Haswell et al. |
| 2013/0283362 A1 | 10/2013 | Kress et al. |
| 2014/0298401 A1 | 10/2014 | Batson et al. |

OTHER PUBLICATIONS

Final Office Action, 11 pages, received in U.S. Appl. No. 12/879,956 , dated Nov. 23, 2012.

Non-Final Office Action, 19 pages, received in U.S. Appl. No. 12/906,904, dated Nov. 13, 2012.

Final Rejection, received in U.S. Appl. No. 12/906,904, dated Jul. 31, 2013.

Notice of Allowance, received in U.S. Appl. No. 12/906,904, dated Oct. 8, 2014.

(56) References Cited

OTHER PUBLICATIONS

Non-Final Office Action, 24 pages, received in U.S. Appl. No. 12/916,348, dated Oct. 24, 2012.
Final Office Action, 26 pages, received in U.S. Appl. No. 12/916,348, dated Jul. 11, 2013.
Notice of Allowance, received in U.S. Appl. No. 12/916,348, dated Nov. 13, 2013.
Non-Final Office Action, received in U.S. Appl. No. 12/916,348, dated Sep. 4, 2014.
Notice of Allowance, received in U.S. Appl. No. 12/916,348, dated Mar. 23, 2015.
Non-Final Office Action, 24 pages, received in U.S. Appl. No. 13/088,265, dated Dec. 12, 2012.
Final Office Action, 33 pages, received in U.S. Appl. No. 13/088,265, dated Jul. 25, 2013.
Notice of Allowance, received in U.S. Appl. No. 13/088,265, dated Feb. 14, 2014.
Non-Final Office Action, 15 pages, received in U.S. Appl. No. 13/171,258, dated Jul. 13, 2012.
Final Office Action, 33 pages, received in U.S. Appl. No. 13/171,258, dated Jan. 11, 2013.
Non-Final Office Action, received in U.S. Appl. No. 13/171,258, dated Apr. 29, 2014.
Final Office Action, received in U.S. Appl. No. 13/171,258, dated Jan. 23, 2015.
Non-Final Office Action, 10 pages, received in U.S. Appl. No. 13/449,049, dated Dec. 13, 2012.
Notice of Allowance, 9 pages, received in U.S. Appl. No. 13/449,049, dated Apr. 29, 2013.
Notice of Allowance, 15 pages, received in U.S. Appl. No. 13/449,049, dated Aug. 13, 2013.
Non-Final Office Action, 9 pages, received in U.S. Appl. No. 13/449,140, dated Dec. 7, 2012.
Final Office Action, 13 pages, received in U.S. Appl. No. 13/449,140, dated Jul. 22, 2013.
Non-Final Rejection, received in U.S. Appl. No. 13/449,140, dated Nov. 15, 2013.
Notice of Allowance, received in U.S. Appl. No. 13/449,140, dated Aug. 11, 2014.
Notice of Allowance, received in U.S. Appl. No. 13/449,140, dated Nov. 20, 2014.
Non-Final Office Action, received in U.S. Appl. No. 13/683,969, dated Feb. 28, 2014.
Non-Final Office Action, received in U.S. Appl. No. 13/683,969, dated Nov. 14, 2014.
Notice of Allowance, received in U.S. Appl. No. 13/683,969, dated Feb. 4, 2015.
Notice of Allowance, received in U.S. Appl. No. 13/683,969, dated Apr. 2, 2015.
Notice of Allowance, received in U.S. Appl. No. 13/866,682, dated Jun. 25, 2014.
Notice of Allowance, received in U.S. Appl. No. 13/866,682, dated Oct. 28, 2014.
Notice of Allowance, received in U.S. Appl. No. 13/866,682, dated Feb. 17, 2015.
Notice of Allowance, received in U.S. Appl. No. 13/866,682, dated Jun. 5, 2015.
Non-Final Office Action, received in U.S. Appl. No. 13/918,067, dated Feb. 27, 2014.
Notice of Allowance, received in U.S. Appl. No. 13/918,067, dated Nov. 17, 2014.
Notice of Allowance, received in U.S. Appl. No. 13/918,067, dated Mar. 2, 2015.
Notice of Allowance, received in U.S. Appl. No. 13/918,067, dated Jun. 15, 2015.
Mon-Final Office Action, received in U.S. Appl. No. 14/262,511, dated Apr. 27, 2015.
Non-Final Office Action, received in U.S. Appl. No. 14/297,468, dated Feb. 26, 2015.
Final Office Action, received in U.S. Appl. No. 14/297,468, dated Oct. 16, 2015.
Non-Final Office Action, received in U.S. Appl. No. 14/297,506, dated Nov. 6, 2014.
Chapin, John, "Hive: Operating System Fault Containment for Shared-Memory Multiprocessors," Technical Report No. CSL-TR-97-712, Computer Systems laboratory, Departments of Electrical Engineering and Computer Science, Stanford University, 156 pages, Jul. 1997.
Hung, Eugene, "Using Behavior Templates to Design Remotely Executing Agents for Wireless Clients," 2004 4th Workshop on Applications and Services in Wireless Networks (ASWN), (2004).
Susitaival, et al., "Analyizing the File Availability and Download Time in a P2P File Sharing System," IEEE, 2007, pp. 88-95.
Thinstall, "Application Virtualization: A Technical Overview of the Thinstall Application Virtualization Platform," Nov. 2006.
VMware, "Introduction to VMware ThinApp" (Published Jun. 27, 2008) retrieved from http://www.vmware.com/pdf/thinapp_intro.pdf on Sep. 27, 2015.
Zheng et al., "SODON: A High Availability Multi-Source Content Distribution Overlay," IEEE, 2004, pp. 87-92.
Non-Final Office Action, 20 pages, received in U.S. Appl. No. 12/188,155, dated Dec. 19, 2011.
Final Office Action, 22 pages, received in U.S. Appl. No. 12/188,155, dated Aug. 31, 2012.
Non-Final Office Action, 22 pages, received in U.S. Appl. No. 12/188,155, dated Feb. 28, 2013.
Notice of Allowance, 11 pages, received in U.S. Appl. No. 12/188,155, dated Jun. 25, 2013.
Notice of Allowance, received in U.S. Appl. No. 12/188,155, dated Oct. 25, 2013.
Notice of Allowance, received in U.S. Appl. No. 12/188,155, dated Feb. 13, 2014.
Restriction Requirement, received in U.S. Appl. No. 12/188,161, dated Dec. 20, 2011.
Non-Final Office Action, 14 pages, received in U.S. Appl. No. 12/188,161, dated May 10, 2012.
Notice of Allowance, 13 pages, received in U.S. Appl. No. 12/188,161, dated Oct. 10, 2012.
Notice of Allowance, 12 pages, received in U.S. Appl. No. 12/188,161, dated Dec. 4, 2012.
Notice of Allowance, 13 pages, received in U.S. Appl. No. 12/188,161, dated Jan. 4, 2013.
Non-Final Office Action, 8 pages, received in U.S. Appl. No. 12/685,576, dated Nov. 2, 2012.
Non-Final Office Action, 8 pages, received in U.S. Appl. No. 12/685,576, dated Jun. 20, 2013.
Final Office Action, received in U.S. Appl. No. 12/685,576, dated Jan. 30, 2014.
Notice of Allowance, received in U.S. Appl. No. 12/685,576, dated Sep. 23, 2014.
Non-Final Office Action, 17 pages, received in U.S. Appl. No. 12/695,107, dated Dec. 8, 2011.
Final Office Action, 16 pages, received in U.S. Appl. No. 12/695,107, dated Oct. 30, 2012.
Notice of Allowance, received in U.S. Appl. No. 12/695,107, dated Sep. 17, 2014.
Notice of Allowance, received in U.S. Appl. No. 12/695,107, dated Jan. 5, 2015.
Notice of Allowance, received in U.S. Appl. No. 12/695,107, dated Mar. 19, 2015.
Notice of Allowance, 21 pages, received in U.S. Appl. No. 12/697,029, dated Aug. 17, 2012.
Notice of Allowance, 26 pages, received in U.S. Appl. No. 12/697,029, dated May 24, 2013.
Notice of Allowance, received in U.S. Appl. No. 12/697,029, dated Oct. 3, 2014.
Notice of Allowance, received in U.S. Appl. No. 12/697,029, dated Jan. 30, 2015.
Restriction Requirement, 5 pages, received in U.S. Appl. No. 12/705,492, dated Mar. 15, 2013.
Restriction Requirement, received in U.S. Appl. No. 12/705,492, dated Aug. 6, 2014.

(56) References Cited

OTHER PUBLICATIONS

Notice of Allowance, received in U.S. Appl. No. 12/705,492, dated Sep. 26, 2014.
Notice of Allowance, received in U.S. Appl. No. 12/705,492, dated Oct. 31, 2014.
Non-Final Office Action, 18 pages, received in U.S. Appl. No. 12/876,082, dated Oct. 22, 2012.
Notice of Allowance, 26 pages, received in U.S. Appl. No. 12/876,082, dated May 10, 2013.
Notice of Allowance, received in U.S. Appl. No. 12/876,082, dated Feb. 28, 2014.
Notice of Allowance, received in U.S. Appl. No. 12/876,082, dated Sep. 26, 2014.
Notice of Allowance, received in U.S. Appl. No. 12/876,082, dated Feb. 20, 2015.
Notice of Allowance, received in U.S. Appl. No. 12/876,082, dated Jun. 17, 2015.
Restriction Requirement, received in U.S. Appl. No. 12/876,085, dated Jan. 27, 2012.
Non-Final Office Action, 9 pages, received in U.S. Appl. No. 12/876,085, dated Mar. 8, 2012.
Final Office Action, 12 pages, received in U.S. Appl. No. 12/876,085, dated Nov. 14, 2012.
Non-Final Office Action, 13 pages, received in U.S. Appl. No. 12/876,085, dated Mar. 18, 2011.
Notice of Allowance, received in U.S. Appl. No. 12/876,085, dated Nov. 14, 2013.
Notice of Allowance, received in U.S. Appl. No. 12/876,085, dated Mar. 6, 2014.
Notice of Allowance, 25 pages, received in U.S. Appl. No. 12/877,918, dated Mar. 19, 2012.
Notice of Allowance, 31 pages, received in U.S. Appl. No. 12/877,918, dated Jun. 21, 2012.
Notice of Allowance, 22 pages, received in U.S. Appl. No. 12/877,918, dated Aug. 16, 2012.
Notice of Allowance, 24 pages, received in U.S. Appl. No. 12/877,918, dated Sep. 26, 2012.
Notice of Allowance, 35 pages, received in U.S. Appl. No. 12/877,918, dated Apr. 26, 2013.
Notice of Allowance, received in U.S. Appl. No. 12/877,918, dated Aug. 20, 2013.
Notice of Allowance, received in U.S. Appl. No. 12/877,918, dated Dec. 13, 2013.
Non Final Office Action, 22 pages, received in U.S. Appl. No. 12/879,947, dated Jul. 10, 2013.
Notice of Allowance, received in U.S. Appl. No. 12/879,947, dated Jan. 27, 2014.
Non-Final Office Action, 11 pages, received in U.S. Appl. No. 12/879,956, dated Jun. 6, 2012.
Non-Final Office Action received in U.S. Appl. No. 14/452,382, dated Feb. 10, 2016.
Non-Final Office Action received in U.S. Appl. No. 14/245,707, dated Feb. 12, 2016.
Non-Final Office Action received in U.S. Appl. No. 14/789,813, dated Feb. 12, 2016.
Non-Final Office Action received in U.S. Appl. No. 13/171,258, dated Apr. 8, 2016.
Notice of Allowance, dated Jun. 7, 2016, received in U.S. Appl. No. 14/608,444.
Notice of Allowance, dated Jun. 23, 2016, received in U.S. Appl. No. 14/877,793.
Lodi, Giorgia, Middleware Services for Dynamic Clustering of Application Servers (University of Bologna, 2006), 99 pages.
Non-Final Office Action, dated Jul. 28, 2016, received in U.S. Appl. No. 14/877,890.
Notice of Allowance, dated Sep. 12, 2016, received in U.S. Appl. No. 14/452,382.
Final Office Action, dated Sep. 15, 2016, received in U.S. Appl. No. 14/789,813.
Non-Final Office Action, dated Sep. 21, 2016, received in U.S. Appl. No. 13/171,258.
Information Disclosure Statement Transmittal filed herewith.
Non-Final Office Action, dated Dec. 15, 2016, received in U.S. Appl. No. 14/789,858.
Notice of Allowance, dated Dec. 21, 2016, received in U.S. Appl. No. 14/789,813.
Final Office Action, dated Apr. 6, 2017, received in U.S. Appl. No. 13/171,258.
Final Office Action, dated May 8, 2017, received in U.S. Appl. No. 14/877,790.
Final Office Action, dated Jul. 13, 2017, received in U.S. Appl. No. 14/789,858.

* cited by examiner

METHOD OF CONFIGURING A VIRTUAL APPLICATION

CROSS-REFERENCE TO RELATED APPLICATIONS

This application is a continuation of U.S. patent application Ser. No. 12/685,576, filed on Jan. 11, 2010.

BACKGROUND OF THE INVENTION

1. Field of the Invention

The present invention is directed generally to methods of configuring a virtual application.

2. Description of the Related Art

A virtual application is a virtual machine image preconfigured with all of the files, registry data, settings, components, runtimes, and other dependencies required for a specific application to execute immediately and without installation on a host computing device. The virtual application is isolated from other applications implemented on a host computing device and at least partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

The virtual application is stored in and implemented by one or more executable files. Depending upon the implementation details, the one or more executable files storing and implementing the virtual application may include blocks of data corresponding to each application file of a natively installed version of the application. Herein, these blocks of data will be referred to as "virtual application files." The one or more executable files storing and implementing the virtual application also include configuration information. When the virtual application is executed, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

As is apparent to those of ordinary skill in the art, the one or more executable files that store and implement the virtual application are read-only. Thus, if these read-only blocks of data are modified by the virtual application (or the virtual operating system) during execution, the modifications are stored in a readable and writable location referred to herein as a sandbox. The sandbox is a location on the host filesystem, a network share, a removable storage device, and the like whereat files may be created, modified, and deleted by the virtual application at runtime. For example, when the virtual operating system needs to create, modify, or delete a virtual application file, the virtual operating system does so in the sandbox. Similarly, if the virtual application modifies a virtual registry value, the virtual registry value is changed in the sandbox. The virtual operating system may also route some requests and actions to the host operating system for processing.

In some cases, a user may wish to configure the one or more executable files that store and implement the virtual application to include modifications that are easily made during runtime but are difficult to implement from outside the application. However, as discussed above, modifications made during runtime cannot be written into the one or more executable files that store and implement the virtual application. Therefore, a need exists for a method or system for merging changes made during runtime into the one or more executable files that store and implement the virtual application. The present application provides these and other advantages as will be apparent from the following detailed description and accompanying figures.

DETAILED DESCRIPTION OF THE INVENTION

Figure 1:
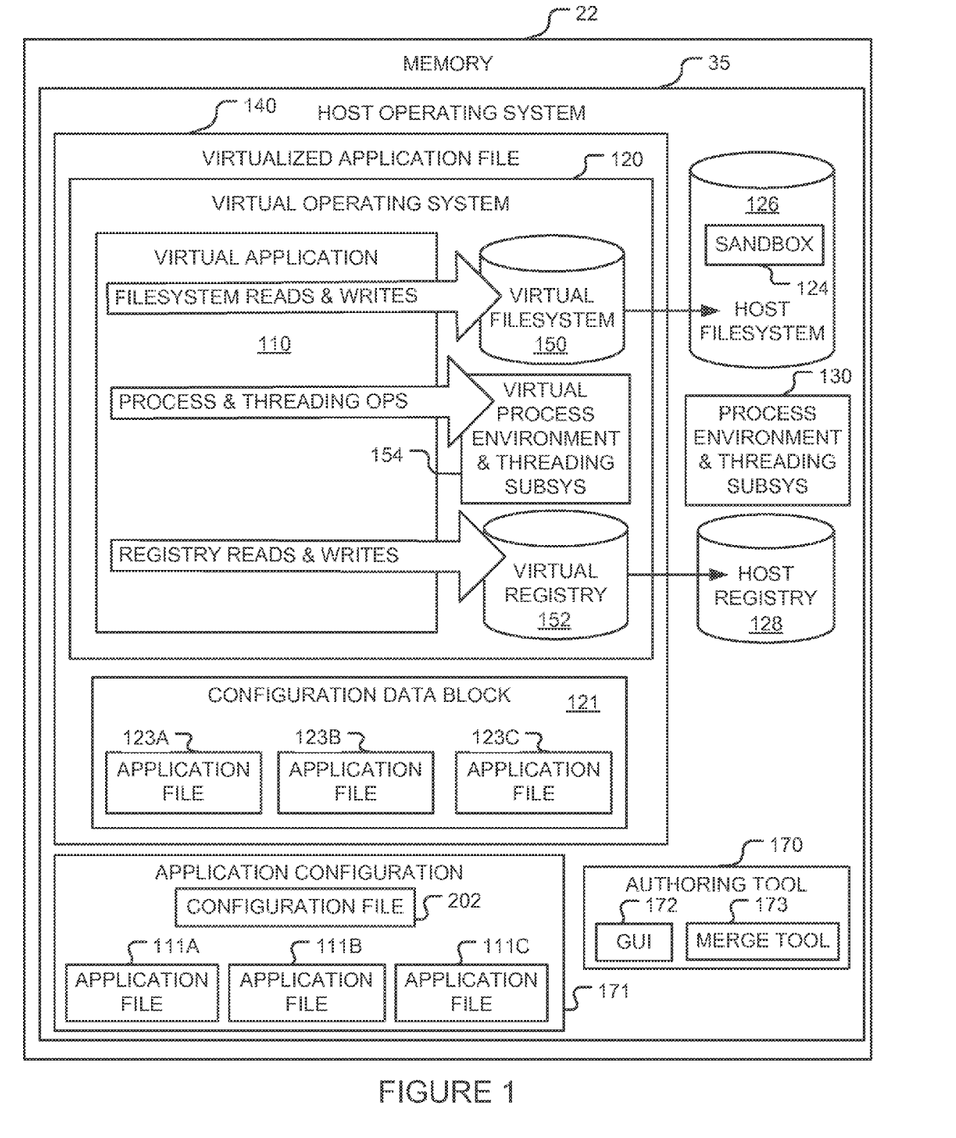
FIG. 1 is an illustration of a conceptualization of software components stored in memory and executing on a host computing device, the software components include a virtualized application file, and a virtual application authoring tool.

FIG. 1 illustrates a system memory 22 storing a conventional host operating system 35, that like most operating systems, includes a host filesystem 126, a host registry 128, and a process environment and threading subsystems component 130. The system memory 22 also stores an executable virtualized application file 140 configured to execute on the host operating system 35, without having been installed on the host operating system 35.

The virtualized application file 140 includes components necessary to implement a virtual runtime environment including a virtual operating system 120 configured to execute in the host operating system 35. A virtual application 110 is configured to execute on the virtual operating system 120. In the embodiment illustrated a single virtual application file is used to implement both the virtual operating system 120 and the virtual application 110. However, those of ordinary skill in the art appreciate that more than one virtual application file may be used to implement the virtual operating system 120 and the virtual application 110.

The virtual operating system 120 includes a virtual filesystem 150, a virtual registry 152, and a virtual process environment and threading subsystems component 154. The virtual application 110 interacts with the virtual filesystem 150, virtual registry 152, and virtual process environment and threading subsystems component 154, instead of interacting directly with the host filesystem 126, the host registry 128, and the process environment and threading subsystems component 130 of the host operating system 35. The virtual operating system 120 is configured to communicate with the host operating system 35 as required to execute the virtual application 110.

The virtualized application file 140 includes a configuration data block 121. The configuration data block 121 may include virtual application files 123A-123C corresponding to each of application files of a natively installed version of the same application. The virtualized application file 140 identifies one or more of the virtual application files 123A-123C as a startup executable that executes when the virtual application 110 is first executed. The startup executable may be identified in the configuration data block 121.

When the virtualized application file 140 is executed, the configuration data block 121 configures the virtual operating system 120 to execute the virtual application. For example, the configuration data block 121 may contain configuration information related to files and directories in the virtual filesystem 150, keys and values in the virtual registry 152, environment variables, services, and the like.

The configuration data block 121 may also include basic application metadata and settings such as the application name, application version, and sandbox location. Further, the configuration data block 121 may provide isolation information to the virtual operating system 120. This information indicates which directories, virtual application files 123A-123C, virtual registry entries, environment variables, and services are to be isolated from the host operating system 35. The configuration data block 121 may also include one or more virtual layers. Each virtual layer may identify files, registry entries, environment variables, and services. As the virtual layers are read, the corresponding files, registry entries, environment variables, and services are added to appropriate runtime data-structures.

While illustrated as being outside the virtual filesystem 150, those of ordinary skill in the art appreciate that the application files 123A-123C may be conceptualized as being within the virtual filesystem 150 when the virtual application 110 is executing.

To execute the virtual application 110, an initialization process is first performed. During this process, the virtual operation system 120 is launched and configured by the configuration data block 121. After the initialization process has completed, the appropriate startup executable(s) is/are launched inside the virtual operating system 120. The virtual operating system 120 intercepts calls to the host operating system 35 and routes them to corresponding components of the virtual operating system 120. For example, when the virtual application 110 requests access an application file that corresponds to the virtual application file 123A using a path of a natively installed version of the application, the virtual operating system 120 intercepts the request and routes the request to one of the virtual application file 123A. The virtual operating system 120 may also route some requests and actions to the host operating system 35 for processing.

U.S. patent application Ser. No. 12/188,155, filed on Aug. 7, 2008, and U.S. patent application Ser. No. 12/188,161 also filed on Aug. 7, 2008, both of which are incorporated herein by reference in their entireties, disclose a system that may be used to create the virtualized application file 140. As described in greater detail in U.S. patent application Ser. Nos. 12/188,155 and 12/188,161, the virtualized application file 140 may be created by a virtual application executable constructor or authoring tool 170 using an application template that includes copies of files, such as a configuration file 202, application files, and the like, used to configure the virtualized application file 140. However, the template is not a requirement. Instead, to build the virtualized application file 140, the authoring tool 170 needs only the configuration file 202 and copies of any applications files necessary for a natively installed version of the application to execute. Depending upon the implementation details, the configuration file 202 may be viewed as a project file created using the authoring tool 170. In other words, the authoring tool 170 may be used to create and modify the configuration file 202.

Figure 2:
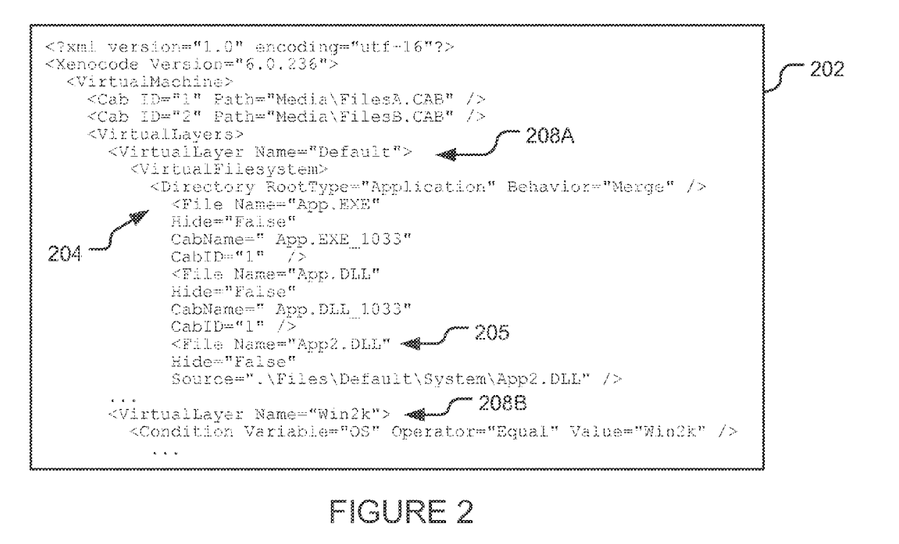
FIG. 2 is an example of a configuration file for use with the virtual application authoring tool of FIG. 1.

The configuration file 202 includes application settings, configuration information, and identifies application files to be incorporated into the virtual application 110. References to files inside the configuration file 202 are relative to the location in which the configuration file 202 is stored. For example, files may be stored in subdirectory ".\Files" located in the same directory in which the configuration file 202 is stored. Example contents of an exemplary configuration file 202 are depicted in FIG. 2. By way of a non-limiting example, the configuration file 202 may be implemented as an XML file containing information for the virtual application 110 related to the virtual filesystem 150, the virtual registry 152, the virtual process environment and threading subsystems component 154 (e.g., services, environment variables, and the like), and the startup executable (s).

The information in the configuration file 202 may be stored in layers 208A and 208B, labeled "VirtualLayers." These layers include a default layer 208A ("<VirtualLayer Name="Default">") having default settings. In addition to the default settings of the default layer 208A, the configuration file 202 may include one or more conditional layers, such as the layer 208B ("<VirtualLayer Name="Win2K">") that specify settings specific to particular operating systems and/or versions thereof.

Returning to FIG. 2, the configuration file 202 includes one or more filesystem configuration portions. For example, each layer 208A and 208B may include a filesystem configuration portion. In the embodiment illustrated, the layer 208A includes a filesystem configuration portion 204. The configuration file 202 references physical files (e.g., application files 111A-111C) accessible by the authoring tool 170. The references are organized in the configuration file 202 in a hierarchy that corresponds to the hierarchy in which the application files are organized by a natively installed version of the application. The hierarchy typically includes well-known root folders. FIG. 2 illustrates an exemplary reference 205 to a physical file named "App2.dll" that may be found at ".\Files\Default\System\App2.DLL." As mentioned above, the reference is relative to the storage location of the configuration file 202.

Turning to FIG. 1, the application files referenced by the configuration file 202 and the configuration file itself are referred to collectively as an application configuration 171. Each time the application configuration 171 is used to create a copy of the virtualized application file 140, the same configuration information is used. However, it may be desirable to modify the application configuration 171 to include modifications that can be readily made by the virtual application 110 itself during runtime. In other words, in certain circumstances, it may be useful to merge changes made by the virtual application 110 during execution into the application configuration 171 so that the next copy of the virtualized application file 140 created includes those modifications.

As shown in FIG. 1, in the embodiment illustrated, the virtualized application file 140 is read-only to the virtual application 110. If the information stored in the virtualized application file 140 is modified by the virtual application 110 during its execution, the modifications are stored in a readable and writable storage location referred to herein as a sandbox 124. The sandbox 124 is a location on the host filesystem 126, a network share, a removable storage device, and the like. For illustrative purposes, the sandbox 124 will be described as a directory named "Virtual" in the host filesystem 126.

In the sandbox 124, files may be created, modified, and deleted by the virtual application 110. For example, when the virtual operating system 120 needs to create, modify, or delete one of the virtual application files 123A-123C, the virtual operating system 120 does so in the sandbox 124. Similarly, if the virtual application 110 modifies a key in the virtual registry 152, the modification is stored in the sandbox 124.

As is apparent to those of ordinary skill in the art, the virtualized application file 140, when executed, may generate a user interface. Modifications made to the virtual application 110 and stored in the sandbox 124 may be controlled or directed by a user operating the user interface.

At any particular instance in time, the virtual filesystem 150 (including the virtual application files 123A-123C) and the virtual registry 152 (as modified by information stored in the sandbox 124) are a snapshot of an instantaneous state of the virtual application 110. In that instance, the sandbox 124 is where runtime changes to the virtual filesystem 150 and/or the virtual registry 152 for the virtual application 110 have been stored. Thus, information related to the instantaneous state of the virtual application 110 is stored in the sandbox 124 and cannot be written by the virtual application 110 to the read-only virtualized application file 140.

Figure 3:
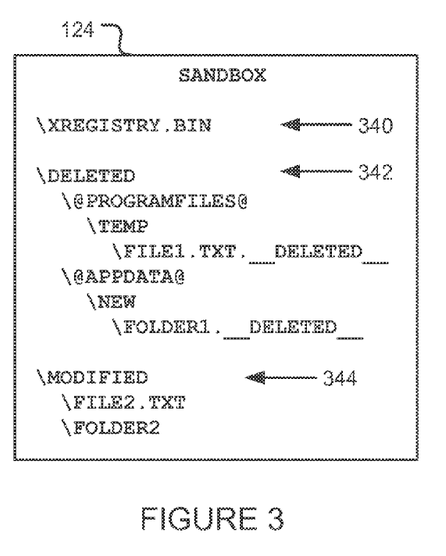
FIG. 3 illustrates contents of an exemplary sandbox used by a virtual application of FIG. 1.

FIG. 3 illustrates a non-limiting exemplary implementation of a file organizational structure that may be used to implement the sandbox 124. By way of a non-limiting example, the sandbox 124 may include a subfolder and/or file that stores modifications to the virtual registry 152. In FIG. 3, modifications to the virtual registry 152 are stored in a file 340 named "XRegistry.bin," which stores modifications to the virtual registry 152 in a binary format.

The sandbox 124 may include one or more subfolders, such as a subfolder 342 named "Deleted" and a subfolder 344 named "Modified," that store changes made to the virtual filesystem 150. In this example, the subfolder 342 named "Deleted" stores identifications and/or copies of deleted files and folders. In FIG. 3, a file named "FILE1.TXT" located at "\Deleted\@PROGRAMFILES@\temp\" and a folder named "FOLDER1" located at "\Deleted\@APPDATA@\new\" have both been identified as having been deleted by the virtual application 110 (see FIG. 1) during execution.

The name of a deleted file may include its original file name followed by an identifier indicating the file has been deleted. For example, in FIG. 3, a character string (such as "._deleted_") may be used as the identifier. Folders that have been deleted also include their original folder name followed by an identifier indicating the folder has been deleted. For example, in FIG. 3, the character string "._deleted_" has been used as the identifier that indicates a folder has been deleted. Folders that do not include this identifier are merely part of a file path (i.e., a placeholder). For example, a folder named "new" identified in the file path of the fold "FOLDER1._deleted_" does not include the identifier and therefore, was not deleted by the virtual application 110 (see FIG. 1).

The subfolder 344 named "Modified" stores identifications and/or copies of modified virtual application files and/or related folders. For example, the subfolder 344 named "Modified" may include a complete copy of virtual application files as modified by the virtual application 110 (see FIG. 1). Alternatively, the subfolder 344 named "Modified" may include information that identifies one or more modified virtual application files and which changes have been made to the files. In FIG. 3, a modified virtual application file named "FILE2.TXT" and a folder named "FOLDER2" have been identified as having been modified (i.e., created or revised in some manner). As is apparent to those of ordinary skill in the art, a virtual application file created by the virtual application 110 (see FIG. 1) during its execution may not correspond to an application file of the natively installed version of the same application.

In the prior art, to modify the virtualized application file 140, the user had to manually edit either the virtualized application file 140 or the files used to create the virtualized application file 140. For example, if the user wished to add a word to a dictionary used by a spell checking process of the virtual application 110, using prior art methods, the user had to locate where (in the natively installed application files) the dictionary was stored, possibly reverse engineer the format of the application file storing the dictionary, and add the word to the dictionary.

Referring to FIG. 1, a sandbox merge tool 173 may be used to merge modifications made to the state of the virtual application 110 and/or virtual operating system 120 by the virtual application 110 itself during runtime, into the application configuration 171 in the appropriate locations. Using this approach, to add a word to the dictionary used by the spell checking process of the virtual application 110, the user would simply execute the virtual application 110 and use whatever mechanisms are provided by the virtual application (e.g., user interface components) to add the word to the dictionary. This modification would be stored by the virtual application 110 and/or the virtual operating system 120 in the sandbox 124. Then, the user would use the sandbox merge tool 173 to modify the application file (e.g., one of the application files 111A-111C) stored in the application configuration 171 that includes the dictionary to include the word. Therefore, the next time the application configuration 171 is used to create a new copy of the virtualized application file 140, the new word will be in the dictionary used by the spell checking process.

U.S. patent application Ser. Nos. 12/188,155 and 12/188,161 disclose a snapshot technique or process that identifies changes made to a platform by a native installation of the application. The sandbox merge tool 173 may be used to make modifications to an existing application configuration 171 without requiring the user to repeat the snapshot process to re-snapshot the entire application. Thus, the sandbox merge tool 173 may save time over repeating the snapshot process. In particular implementations, the sandbox merge tool 173 may be used to integrate configuration customizations into the application configuration 171 that were made manually after the initial snapshot is recorded.

The sandbox merge tool 173 reads the contents of the sandbox 124 and writes them to the application configuration 171. Thus, to modify the virtualized application file 140, the user need not understand the inner workings of the virtual application 110, the structures of the application configuration 171, or the formats of the files included in the application configuration 171. Further, the user need not even know what modifications are stored in the sandbox 124.

By way of a non-limiting example, the sandbox merge tool 173 may be implemented as a component of the authoring tool 170 described in greater detail in U.S. patent application Ser. Nos. 12/188,155 and 12/188,161. The sandbox merge tool 173 may be directed to merge modifications stored in the sandbox 124 into the application configuration 171 via a user interface (e.g., a graphical user interface 172) provided by the authoring tool 170. The user may use a separate user interface provided by the virtualized application file 140 to instruct the virtual application 110 to store modifications made to the virtual application 110 and/or the virtual operating system 120 in the sandbox 124. Thus, two separate user interfaces provided by two separate applications (i.e., the virtual application 110 and the authoring tool 170) may be used. Further, the modifications stored in the sandbox 124 may be merged into the application configuration 171 after execution of the virtual application 110 has terminated.

Figure 5:
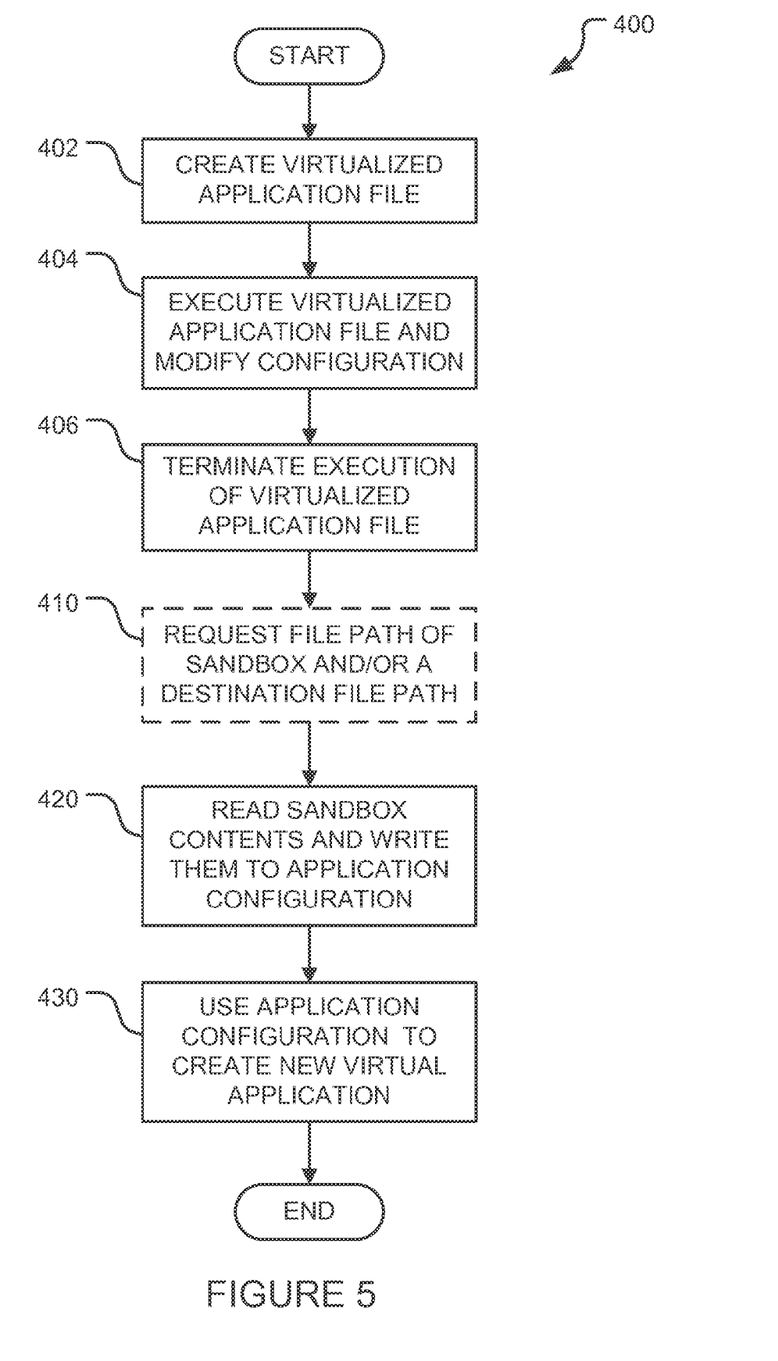
FIG. 5 is a flow diagram of a method of modifying an application configuration.

FIG. 5 provides a flow diagram of a method 400. The following description of the method 400 also references the components illustrated in FIG. 1. In first block 402, the user uses the authoring tool 170 to create the virtualized application file 140. In next block 404, the user executes the virtualized application file 140 and makes one or more desired changes to the configuration of the virtual application 110. Then, in block 406, the user closes or otherwise terminates execution of the virtual application 110.

To perform the sandbox merge process, the sandbox merge tool 173 needs to know the location (e.g., file path) of the sandbox 124, and a destination location for a resulting merged file. In optional block 410 of the method 400, the sandbox merge tool 173 may request identification of the location of the sandbox 124. For example, the sandbox merge tool 173 may display a dialog box requesting the file path of the sandbox 124. Optionally, a default file path may be provided. By way of a non-limiting example, the default file path may be the file path specified for the last virtual application created by the authoring tool 170.

In optional block 410, the sandbox merge tool 173 may also request identification of the destination file path on the host filesystem 126 in which to store the resulting merged file. By way of a non-limiting example, the location in which the virtualized application file 140 is stored may be used as the destination location. In other words, the virtualized application file 140 may be overwritten. Alternatively, a new file may be created by the method 400. By way of a non-limiting example, the sandbox merge tool 173 may display a dialog box requesting the destination file path.

Next, in block 420, the contents of the sandbox 124 are read from the location identified by the sandbox file path and written to the application configuration 171. Finally, in block 430, the application configuration 171 is used to create a new copy of the virtualized application file 140 stored in the location identified by the destination file path. Then, the method 400 terminates.

Figure 6:
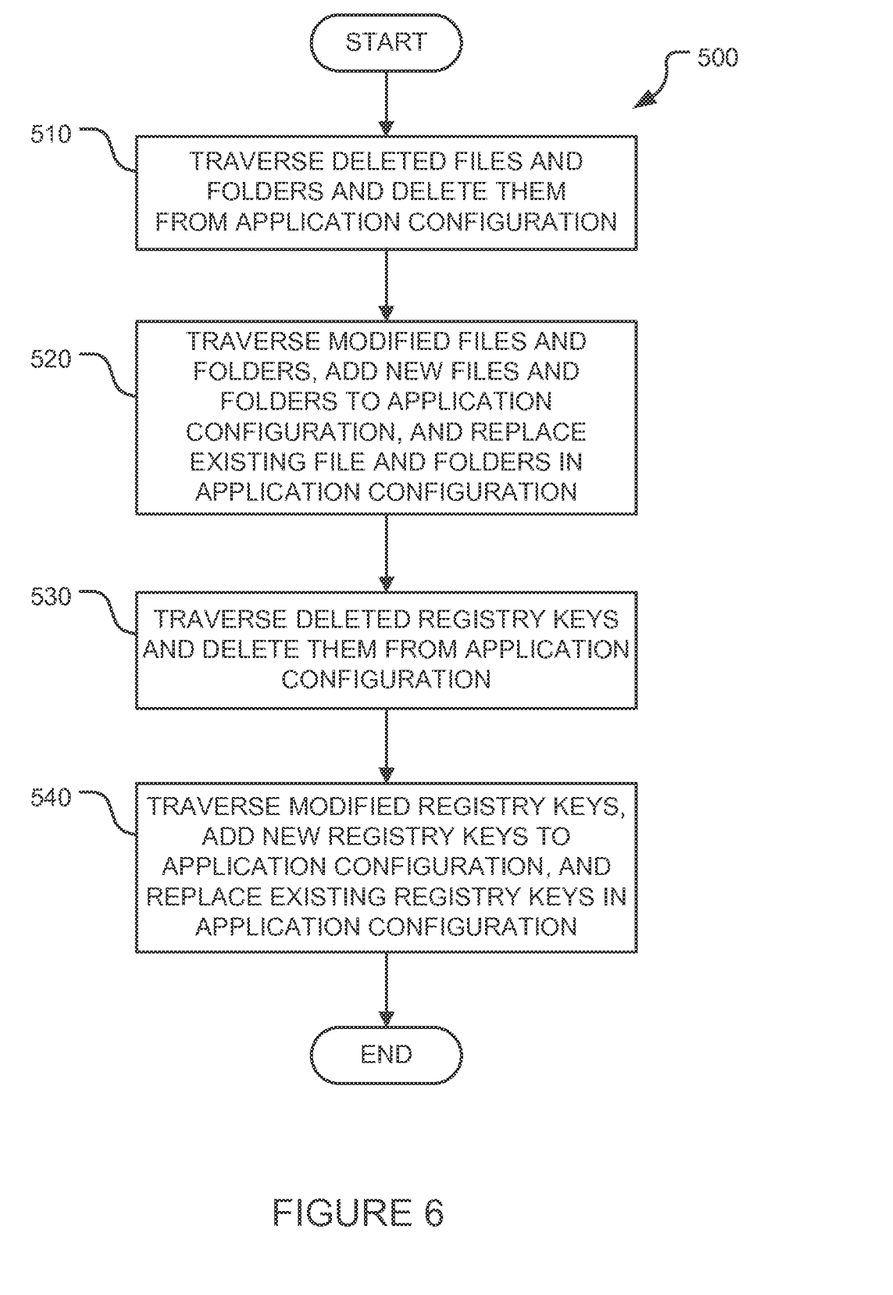
FIG. 6 a flow diagram of a method of reading the contents of the sandbox and writing them to application configuration.

FIG. 6 is flow diagram of an exemplary implementation of a method 500 which may be performed by the sandbox merge tool 173 in block 420 of the method 400 illustrated in FIG. 5. The following description of the method 500 also references the components illustrated in FIG. 1.

In first block 510, the sandbox merge tool 173 identifies any deleted virtual application files and/or folders from the information stored in the sandbox 124 and deletes the files and/or folders identified from the application configuration 171. As mentioned above, the sandbox 124 may include one or more subfolders or sub-directories. In the embodiment illustrated, deleted files and/or folders are identified and/or stored in the subfolder 342 named "Deleted." Within the subfolder 342 named "Deleted," the files and/or folders to be deleted may be identified using the well-known root folders (such as @PROGRAMFILES@, @APPDATA@, etc.) that correspond to root nodes in the filesystem configuration portion 204 of the configuration file 202 of the application configuration 171. In other words, a file path corresponding to the file path provided in the filesystem configuration portion 204 may be specified for each virtual application file or folder to be deleted. Using the specified file paths, the correct portions of the application configuration 171 (i.e., references to the deleted files in the filesystem configuration portion 204 and copies of the deleted files) may be located and deleted.

For example, if the subfolder 342 named "Deleted" identifies the virtual application file "\@PROGRAMFILES@\temp\test.exe._deleted_" for deletion, the sandbox merge tool 173 determines where in the application configuration 171 this file is located and deletes the file from the application configuration 171. References to the file to be deleted may also be deleted from the filesystem configuration portion 204 of the configuration file 202.

Within the subfolder 342 named "Deleted," the deleted folders may be traversed depth first, and the files and folders deleted from the application configuration 171, which may, depending upon the implementation details, include deletion of the files and folders from application configuration 171 and deletion of references to those files and folders from the configuration file 202 as they are encountered during the traversal. As is appreciated by those of ordinary skill in the art, the phrase "depth first" indicates that the contents of the present node (e.g., a folder, a key, etc.) are traversed before the contents of sibling nodes are traversed. The following pseudo-code provides a non-limiting example of this process:

```
foreach (directory in "Virtual\Deleted")
    ReadDeletedFiles (directory);
void ReadDeletedFiles (directory)
{
    foreach (file in directory.GetFiles ( ))
        fileNode = configuration. GetNodeFromPath (file.GetPath ( ));
        configuration.RemoveFile (fileNode);
    foreach (childDirectory in directory.GetDirectories ( ))
        if (childDirectory.Name.EndsWith ("._deleted"))
            childNode = configuration.GetNodeFromPath
(childDirectory.GetPath ( ));
            configuration.RemoveDirectory (childNode);
        else
            ReadDeletedFiles (childDirectory);
}
```

Next, in block 520, the sandbox merge tool 173 traverses modified virtual application files and folders in the sandbox 124, and attempts to locate corresponding files and/or folders in the application configuration 171. If a corresponding file or folder is located by the sandbox merge tool 173, the sandbox merge tool 173 replaces the corresponding file or folder with the modified version stored in the sandbox 124. On the other hand, if a corresponding file or folder is not located by the sandbox merge tool 173, the sandbox merge tool 173 adds the new file or folder to the application configuration 171.

In the embodiment illustrated, modified files and/or folders are stored in the subfolder 344 named "Modified." Within the subfolder 344 named "Modified," the files and/or folders to be modified may be identified using the same well-known root folders (such as @PROGRAMFILES@, @APPDATA@, etc.) used with respect to the subfolder 342 named "Deleted."

Within the subfolder 344 named "Modified," the modified folders may be traversed depth first, and the files and folders modified or replaced in the application configuration 171. Depending upon the implementation details, this may include replacing the files and folders in application configuration 171 with the version stored in the sandbox 124, and modifying references to those files and folders in the configuration file 202 as they are encountered during the traversal If during the traversal, a new file or folder is discovered that is not in the application configuration 171, the new file or folder is added to the application configuration 171. References to the new file or folder may also be added to the configuration file 202 as necessary.

In present embodiment, if a virtual application file identified in the subfolder 344 named "Modified" corresponds to a file in the application configuration 171, the file in the application configuration 171 is replaced with the corresponding file identified in the subfolder 344 named "Modified." Thus, all files identified in the subfolder 344 named "Modified" are copied into the application configuration 171.

The following pseudo-code provides a non-limiting example of a method of traversing the subfolder 344 named "Modified" and modifying the application configuration 171 to include the modified files or folders encountered during the traversal:

```
foreach (directory in "Virtual\Modified")
    ReadModifiedFiles (directory);
void ReadModifiedFiles (directory)
{
    foreach (file in directory.GetFiles ( ))
        fileNode = configuration. GetNodeFromPath (file.GetPath ( ));
        configuration.ReplaceExistingFile (fileNode, file)
    foreach (childDirectory in directory.GetDirectories ( ))
        ReadModifiedFiles (childDirectory)
}
```

Next, in block 530, the sandbox merge tool 173 traverses the deleted registry keys stored in the sandbox 124 and deletes the deleted registry keys from the application configuration 171. As is apparent to those of ordinary skill in the art, a registry (such as the host registry 128 and the virtual registry 152) may be implemented as a hierarchical database that contains data critical for the operation of the operating system and the applications and services that run on the operating system. This data may be structured in a tree or hierarchy, wherein each node in the hierarchy is referred to as a key. The registry may be divided into hives. Each hive is a logical group of keys, sub-keys, and values associated with a set of supporting files containing backups of the data stored in the hive. As is apparent to those of ordinary skill in the art, the virtual registry 152 may include one or more hives. In the present embodiment, the virtual registry 152 includes four hives: (1) a Current User hive; (2) a Classes Root hive; (3) a Local Machine hive; and (4) a Users hive.

Figure 4:
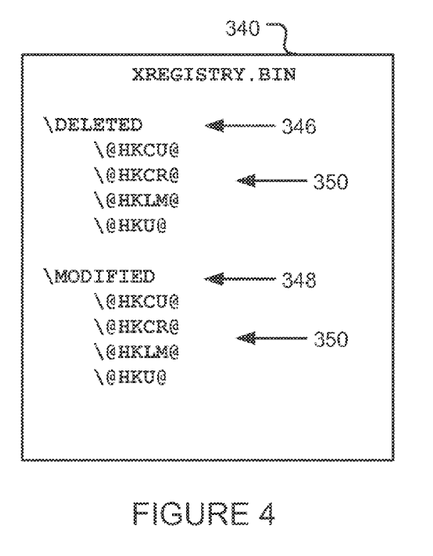
FIG. 4 illustrates contents of an exemplary binary file used by a virtual application of FIG. 1 to store modifications to a virtual registry.

As mentioned above, in the present exemplary embodiment illustrated in FIGS. 3 and 4, modifications made to the virtual registry 152 (see FIG. 1) are stored in the binary file 340 named "XRegistry.bin." The binary file contains a signature header, a version, and a tree or hierarchical structure for modifications made to the virtual registry 152. The tree structure in the binary file 340 may also be organized into hives. By way of a non-limiting example, the tree structure in the binary file 340 may include a hive 346 for deleted keys, and a separate hive 348 for modified keys.

Each of the hives 346 and 348 may include sub-nodes 350 that each represent a hive of the virtual registry 152 (see FIG. 1). For example, the hive 346 for deleted keys, and the hive 348 for modified keys may each include four sub-nodes shown in a right-hand column of Table A below that correspond to hives of the virtual registry 152 shown in a left-hand column of Table A.

TABLE A

| Sub-node Name | Corresponding Hive in Virtual Registry |
|---|---|
| @HKCU@ | Current User |
| @HKCR@ | Classes Root |
| @HKLM@ | Local Machine |
| @HKU@ | Users |

Returning to FIG. 1, the application configuration 171 includes registry configuration information that is incorporated into the virtualized application file 140 and used to configure the hives of the virtual registry 152 at runtime. For example, registry configuration information may be stored in the configuration file 202 and incorporated into the configuration data block 121 of the virtualized application file 140 by the authoring tool 170. Optionally, the registry configuration information may include one or more files that are incorporated into the configuration data block 121 of the virtualized application file 140 by the authoring tool 170.

The registry configuration information stored in the configuration file 202 may be organized in the same hierarchy and tree structure used by the virtual registry 152. Thus, the sub-nodes 350 in both the hive 346 for deleted keys and the hive 348 for modified keys may correspond directly to the hierarchy and tree structure used by the configuration file 202. In other words, the sub-nodes 350 of the hive 346 for deleted keys, and the sub-nodes 350 of the hive 348 for modified keys may be identical to the hives of the configuration file 202. Further, each of the sub-nodes 350 may themselves include sub-nodes (not shown) that correspond to sub-nodes of the corresponding hive of the configuration file 202.

Deleted keys (which correspond to nodes of the tree structure) may be identified in the same manner deleted files or folders are identified. For example, the name of a deleted key may include its original name followed by the character string "._deleted_." Identifiers of nodes or keys that do not include this character string may function as placeholders. The hive 346 for deleted keys may be traversed depth first, and the keys deleted from the configuration file 202. Similarly, files associated with the deleted keys, if any, may be deleted from the application configuration 171. The following pseudo-code provides a non-limiting example of this process:

```
foreach (key in deletedKeys)
    ReadDeletedKeys (key);
void ReadDeletedKeys (key)
{
    foreach (childKey in key.GetSubKeys ( ))
        if (childKey.Name.EndsWith ("._deleted"))
            childNode = configuration.GetNodeFromPath (childKey.GetPath
                ( ));
            configuration.RemoveKey (childNode);
        else
            ReadDeletedKeys (childKey);
}
```

Returning to FIG. 6, in block 540, the sandbox merge tool 173 traverses the modified registry keys stored in the sandbox 124 (e.g., in the binary file 340 illustrated in FIGS. 3 and 4), adds any new registry keys encountered during the traversal to the configuration file 202, and modifies existing registry keys in the configuration file 202 corresponding to modified keys encountered during the traversal. Then, the method 500 terminates.

In the present embodiment, in block 540, the sandbox merge tool 173 traverses the modified registry keys by traversing the hive 348 for modified keys in the binary file 340. A registry key faults into the hive 348 for modified keys when any value in the key is changed or deleted, or when a sub-key faults into the hive 348 for modified keys. When a registry key is faulted into the hive 348 for modified keys, all values associated with the faulted key are also faulted into the hive 348. In the hive 348, the name of a faulted key (or node) corresponds directly to the key name used by the virtual registry 152. Further, the value names and values associated with the faulted key correspond directly to the value names and values used by the virtual registry 152.

If a faulted key corresponds to an existing key in the configuration file 202, the authoring tool 170 clears the values associated with the corresponding existing key and replaces them with the values associated with the faulted key. If a faulted key does not correspond to an existing key in the configuration file 202, a new key is created in the configuration file 202 for the faulted key, and the values associated with the faulted key are added to the configuration file 202. The hive 348 for modified keys may be traversed depth first, and the keys in the configuration file 202 updated or modified as they are encountered during the traversal. The following pseudo-code provides a non-limiting example of this process:

```
foreach (key in modifiedKeys)
   ReadModifiedKeys (key);
void ReadModifiedKeys (key)
{
   keyNode = configuration.GetNodeFromPath (key.GetPath ( ));
   configuration.ClearAllValues (keyNode);
   foreach (value in key.GetValues ( ))
      valueNode = configuration.GetNodeFromPath (value.GetPath ( ));
      configuration.AddValue (valueNode, value);
   foreach (childKey in key.GetSubKeys ( ))
      ReadModifiedKeys (childKey);
}
```

Figure 7:
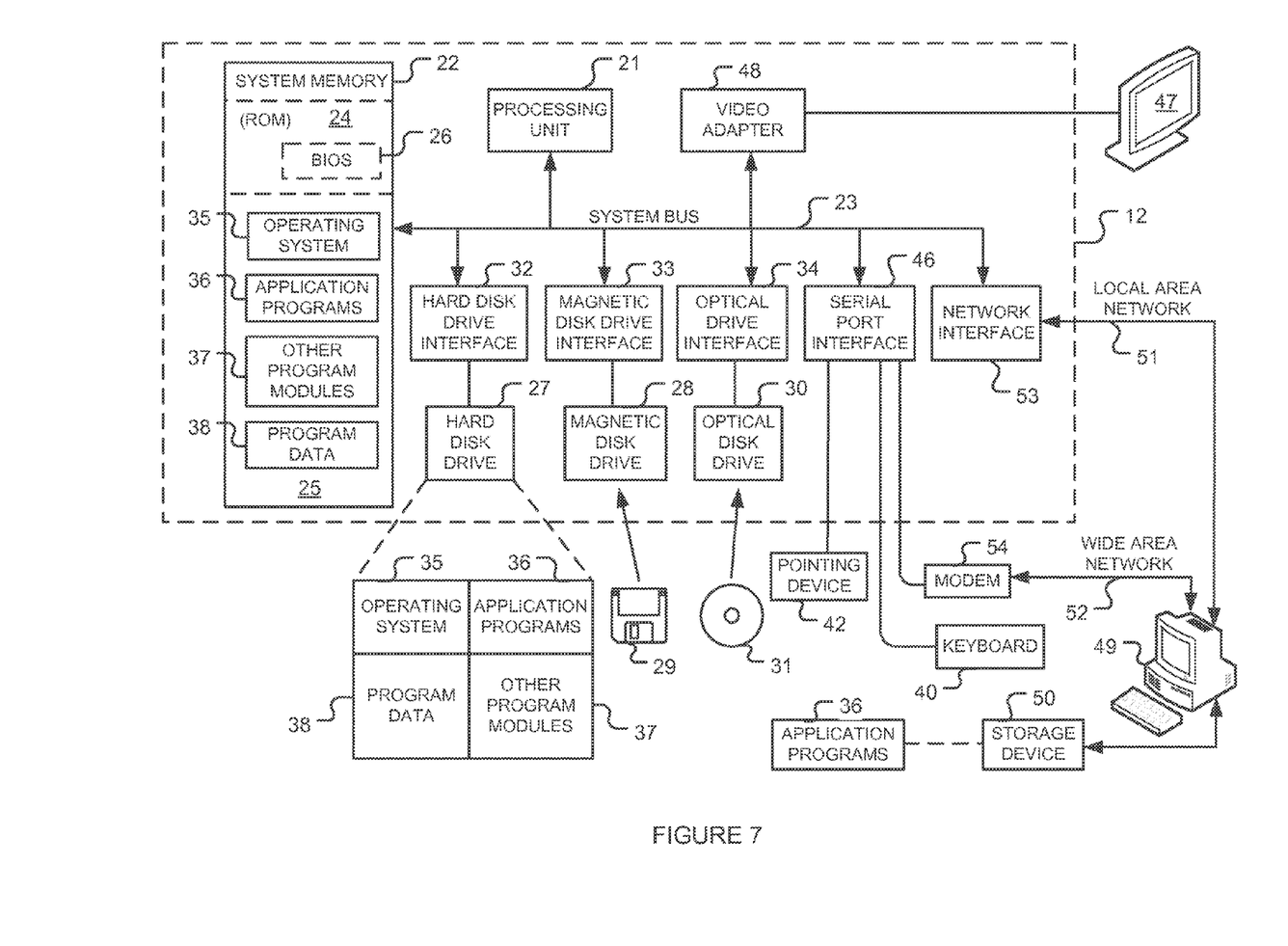
FIG. 7 is a diagram of a hardware environment and an operating environment in which the computing device of the system of FIG. 1 may be implemented.

FIG. 7 is a diagram of hardware and an operating environment in conjunction with which implementations of the virtualized application file 140, the authoring tool 170, and/or the sandbox merge tool 173 may be practiced. The description of FIG. 7 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 7 includes a general-purpose computing device in the form of a computing device 12. Each of the virtualized application file 140, the authoring tool 170, and/or the sandbox merge tool 173 may be implemented using one or more computing devices like the computing device 12. By way of non-limiting example, the virtualized application file 140, the authoring tool 170, and the sandbox merge tool 173 may be implemented on the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 7 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIG. 1, the host operating system 35, the virtualized application file 140, the authoring tool 170, and the sandbox merge tool 173 may be stored as computer executable components on the system memory 22. Each of the host operating system 35, the virtualized application file 140, the authoring tool 170, and the sandbox merge tool 173 may be implemented using software components that are executable by the processing unit 21 and when executed perform the functions described above.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method of modifying a virtual application configuration used to configure a virtualized version of an application, the method comprising:

creating, with a computing system, a read-only first virtualized application file using the virtual application configuration;

executing the first virtualized application file, the executing first virtualized application file storing information identifying modifications to data stored in the first virtualized application file in a memory location;

reading, with the computing system, the information stored in the memory location; and creating, with the computing system, a modified virtual application configuration by merging the information read from the memory location into the virtual application configuration, the modified virtual application configuration being usable by the computing system to create a read-only second virtualized application file.

2. The method of claim 1, wherein the virtual application configuration comprises a virtual registry configuration portion,
the first virtualized application file comprises a virtual registry,
the information stored in the memory location identifies a registry modification made to the virtual registry by the executing first virtualized application file, and
merging the information read from the memory location into the virtual application configuration comprises merging the registry modification into the virtual registry configuration portion of the virtual application configuration.

3. The method of claim 1, wherein the first virtualized application file comprises a virtual registry,
the information stored in the memory location identifies registry modifications made to the virtual registry by the executing first virtualized application file,
the registry modifications are organized into a hierarchy within the information, and
reading the information stored in the memory location comprises traversing the hierarchy.

4. The method of claim 1, wherein the first virtualized application file has a portion configured to implement a virtual filesystem,
the virtual application configuration comprises a virtual filesystem configuration portion used by the computing system to configure the portion of the first virtualized application file that implements the virtual filesystem,
the information stored in the memory location identifies filesystem modifications made to the virtual filesystem by the executing first virtualized application file, and
merging the information read from the memory location into the virtual application configuration comprises merging the filesystem modifications into the virtual filesystem configuration portion of the virtual application configuration.

5. The method of claim 1, further comprising:
creating, with a computing system, the read-only second virtualized application file using the modified virtual application configuration.

6. The method of claim 1, wherein the first virtualized application file is executed on a computing device that is different from the computing system.

7. The method of claim 1, wherein the first virtualized application file implements the virtualized version of the application when executed,
the information stored in the memory location identifies a modification made to a state of the virtualized version of the application, and
merging the information read from the memory location into the virtual application configuration comprises merging the modification made to the state of the virtualized version of the application into the virtual application configuration.

8. The method of claim 1, further comprising:
capturing the virtual application configuration using a snapshot process that identifies changes made to a platform by a native installation of the application.

9. The method of claim 1, further comprising:
receiving, with the computing system, a user command to modify the virtual application configuration, wherein, the information stored in the memory location is read from the memory location and the modified virtual application configuration is created in response to the user command.

10. The method of claim 1, further comprising:
requesting, with the computing system, an identification of the memory location before reading the information stored in the memory location; and
receiving, with the computing system, the identification of the memory location in response to the request.

11. The method of claim 1, further comprising:
requesting an identification of a location in which to store the modified virtual application configuration; and
receiving the identification of the location in which to store the modified virtual application configuration in response to the request before creating the modified virtual application configuration.

12. The method of claim 1, wherein the information stored in the memory location is stored in a plurality of folders each comprising one or more files, and
reading the information stored in the memory location comprises traversing the one or more files of each of the plurality of folders.

13. The method of claim 1, wherein a first portion of the information stored in the memory location is stored in a first folder,
the first portion identifies deletions made to the data stored in the first virtualized application file,
a different second portion of the information stored in the memory location is stored in a different second folder, and
the second portion identifies modifications other than deletions made to the data stored in the first virtualized application file.

14. A computing system having at least one processor configured to execute instructions that when executed cause the at least one processor to:
create a read-only first virtualized application file using a virtual application configuration, the first virtualized application file being configured to be executed, the first virtualized application file storing information in a memory location as the first virtualized application file executes, the stored information identifying modifications made to data stored in the first virtualized application file;
read the information stored in the memory location; and
create a modified virtual application configuration by merging the information read from the memory location into the virtual application configuration, the modified virtual application configuration being usable by the computing system to create a read-only second virtualized application file.

15. The computing system of claim 14, wherein the virtual application configuration comprises a virtual registry configuration portion,
the first virtualized application file comprises a virtual registry,
the information stored in the memory location identifies a registry modification made to the virtual registry by the first virtualized application file when the first virtualized application file was executed, and
merging the information read from the memory location into the virtual application configuration comprises merging the registry modification into the virtual registry configuration portion of the virtual application configuration.

16. The computing system of claim 14, wherein the first virtualized application file comprises a virtual registry, the information stored in the memory location identifies registry modifications made to the virtual registry by the first virtualized application file when the first virtualized application file was executed, the registry modifications are organized into a hierarchy within the information, and reading the information stored in the memory location comprises traversing the hierarchy.

17. The computing system of claim 14, wherein the first virtualized application file has a portion configured to implement a virtual filesystem, the virtual application configuration comprises a virtual filesystem configuration portion used by the computing system to configure the portion of the first virtualized application file that implements the virtual filesystem, the information stored in the memory location identifies filesystem modifications made to the virtual filesystem by the first virtualized application file when the first virtualized application file was executed, and merging the information read from the memory location into the virtual application configuration comprises merging the filesystem modifications into the virtual filesystem configuration portion of the virtual application configuration.

18. The computing system of claim 14, wherein the first virtualized application file was executed on a computing device that is different from the computing system.

19. The computing system of claim 14, wherein the first virtualized application file implements a virtualized version of an application when executed, the information stored in the memory location identifies a modification made to a state of the virtualized version of the application, and merging the information read from the memory location into the virtual application configuration comprises merging the modification made to the state of the virtualized version of the application into the virtual application configuration.

20. The computing system of claim 14, wherein the first virtualized application file implements a virtualized version of an application when executed, and the instructions, when executed by the at least one processor, cause the at least one processor to capture the virtual application configuration using a snapshot process that identifies changes made to a platform by a native installation of the application.

21. The computing system of claim 14, wherein the information stored in the memory location is stored in a plurality of folders each comprising one or more files, and reading the information stored in the memory location comprises traversing the one or more files of each of the plurality of folders.

* * * * *

UNITED STATES PATENT AND TRADEMARK OFFICE
CERTIFICATE OF CORRECTION

PATENT NO. : 9,773,017 B2  
APPLICATION NO. : 14/608033  
DATED : September 26, 2017  
INVENTOR(S) : C. Michael Murphey et al.

Page 1 of 1

It is certified that error appears in the above-identified patent and that said Letters Patent is hereby corrected as shown below:

On the Title Page

Item (63) should be added, and it should read:
-- Continuation of application No. 12/685,576, filed on January 11, 2010, now Pat. No. 8,954,958 --

Signed and Sealed this
Twenty-ninth Day of January, 2019

Andrei Iancu
*Director of the United States Patent and Trademark Office*